United States Patent [19]

Luo

[11] Patent Number: 5,684,261

[45] Date of Patent: Nov. 4, 1997

[54] KARAOKE DEVICE CAPABLE OF WIRELESSLY TRANSMITTING VIDEO AND AUDIO SIGNALS TO A TELEVISION SET

[75] Inventor: Chin-Kuang Luo, Taichung, Taiwan

[73] Assignee: Sycom International Corp., Taichung, Taiwan

[21] Appl. No.: 707,080

[22] Filed: Sep. 3, 1996

[51] Int. Cl.$^6$ .................................. G10H 1/36; G10H 5/00
[52] U.S. Cl. .................................. 84/609; 84/634; 84/650; 434/307 A
[58] Field of Search ...................... 84/609–613, 649–652, 84/634–637, 666–669; 434/307 A

[56] References Cited

U.S. PATENT DOCUMENTS

| | | | |
|---|---|---|---|
| 5,473,106 | 12/1995 | Miyashita et al. | 84/609 |
| 5,496,178 | 3/1996 | Back | 434/307 A |
| 5,561,849 | 10/1996 | Mankovitz | 455/45 |

FOREIGN PATENT DOCUMENTS 0 277 014  8/1988  European Pat. Off. .

*Primary Examiner*—William M. Shoop, Jr.
*Assistant Examiner*—Marlon T. Fletcher
*Attorney, Agent, or Firm*—Cushman Darby & Cushman, IP Group of Pillsbury Madison & Sutro, LLP

[57] ABSTRACT

A karaoke device includes a song memory unit for storing digital audio data therein; a processing unit operable to retrieve the digital audio data from the song memory unit; an audio synthesizer unit for receiving the digital audio data and for generating a stereophonic digital audio output corresponding to the digital audio data; a digital-to-analog converting unit converting the digital audio output into an analog audio signal and adapted to be connected electrically to an external microphone unit so as to receive an external voice signal therefrom, the converting unit mixing the analog audio signal and the external voice signal and generating a mixed audio signal output; and an audio-visual signal transmitting unit including an image memory unit for storing predetermined digital video data and character data therein, control means for receiving lyrics data from the processing unit and the digital video data from the image memory unit, the control means being operable to convert the digital video data to an analog video signal and to generate character images based on the character data and corresponding to the lyrics data, the character images being superimposed on the analog video signal, and a transmitting circuit for transmitting wirelessly the video signal and the audio output for reception by the television set.

7 Claims, 8 Drawing Sheets

KARAOKE DEVICE CAPABLE OF WIRELESSLY TRANSMITTING VIDEO AND AUDIO SIGNALS TO A TELEVISION SET

BACKGROUND OF THE INVENTION

1. Field of the Invention

This invention relates to a karaoke device, more particularly to a karaoke device which is capable of wirelessly transmitting video and audio signals to a television set.

2. Description of the Related Art

Presently, there are many types of karaoke devices that are available in the market. However, connection of these karaoke devices to a television set must rely on the use of electrical cables, thereby resulting in an untidy appearance since the electrical cables are usually exposed and are disorderly.

SUMMARY OF THE INVENTION

Therefore, the objective of the present invention is to provide a karaoke device which is capable of wirelessly transmitting video and audio signals to a television set.

According to the present invention, a karaoke device is capable of wirelessly transmitting video and audio signals to a television set and includes a song memory unit for storing digital audio data and lyrics data therein. A processing unit is connected electrically to the song memory unit and is operable to retrieve the digital audio data and the lyrics data from the song memory unit. An audio synthesizer unit is connected electrically to the processing unit for receiving the digital audio data and for generating a stereophonic digital audio output corresponding to the digital audio data. A digital-to-analog converting unit includes a digital-to-analog converter which is connected electrically to the synthesizer unit and which receives and converts the digital audio output into an analog audio signal, and a mixer which is connected electrically to the converter so as to receive the analog audio signal and which is adapted to be connected electrically to an external microphone unit so as to receive an external voice signal therefrom. The mixer mixes the analog audio signal and the external voice signal and generates a mixed audio signal output. An audio-visual signal transmitting unit includes an image memory unit for storing predetermined digital video data and character data therein. A control means is connected electrically to the processing unit and the image memory unit for the receiving the lyrics data from the processing unit and the digital video data from the image memory unit. The control means is operable to convert the digital video data to an analog video signal and to generate characters based on the character data and corresponding to the lyrics data. The characters are superimposed on the analog video signal. A modulator is connected electrically to the control means and the converting unit so as to receive the video signal from the control means and the audio signal output from the converting unit and so as to generate a modulated video signal and a modulated audio output. A frequency doubler is connected electrically to the modulator so as to receive the modulated video signal and the modulated audio output. The frequency doubler increases the frequency of the modulated video signal and the modulated audio output to a range which can be accepted by the television set. A transmitting circuit is connected electrically to the frequency doubler and wirelessly transmits the video signal and the audio output from the frequency doubler for reception by the television set.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1A:
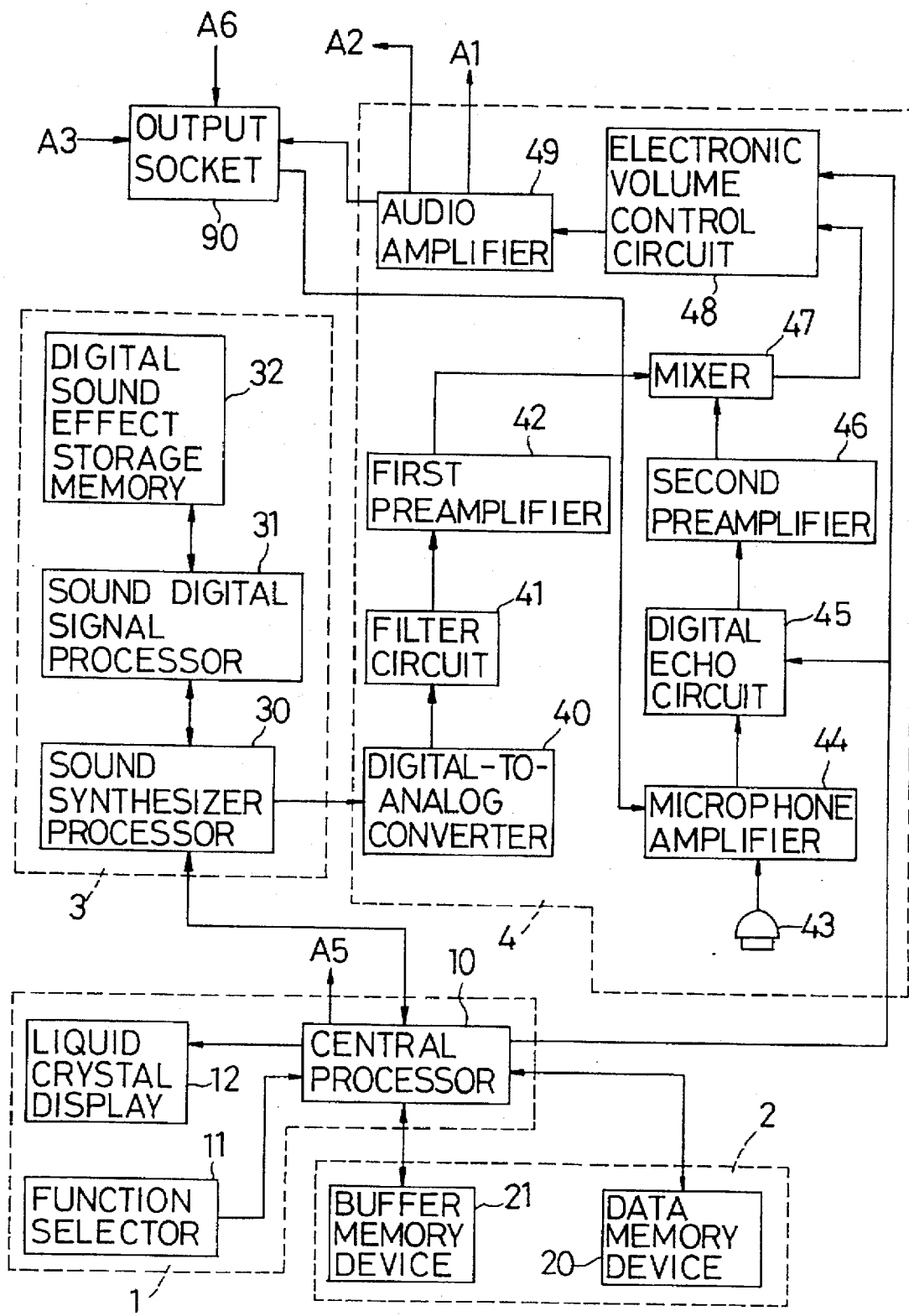
FIGS. 1A, 1B and 1C are schematic block diagrams of a preferred embodiment of a karaoke device according to the present invention.
Figure 1B:
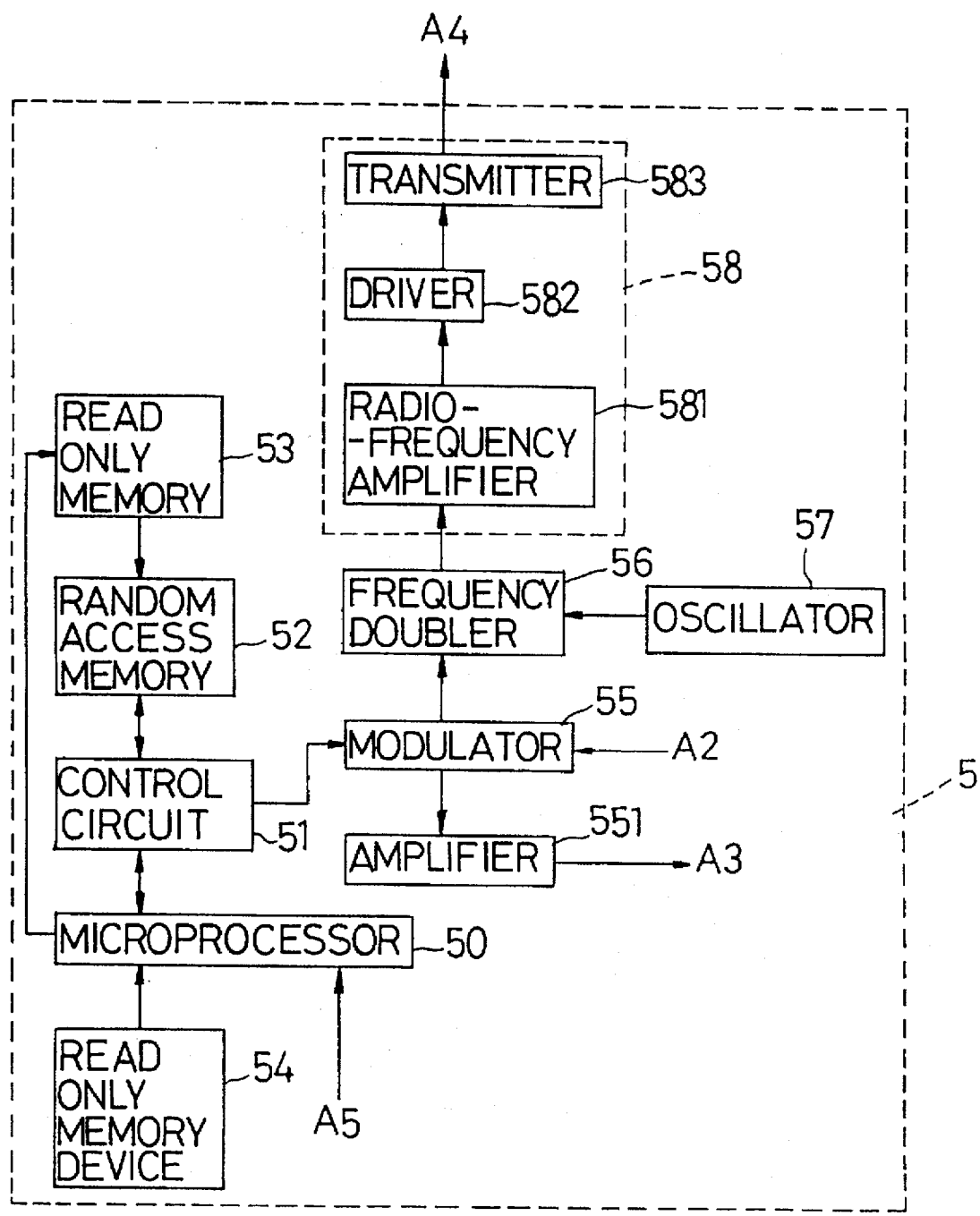
Figure 1C:
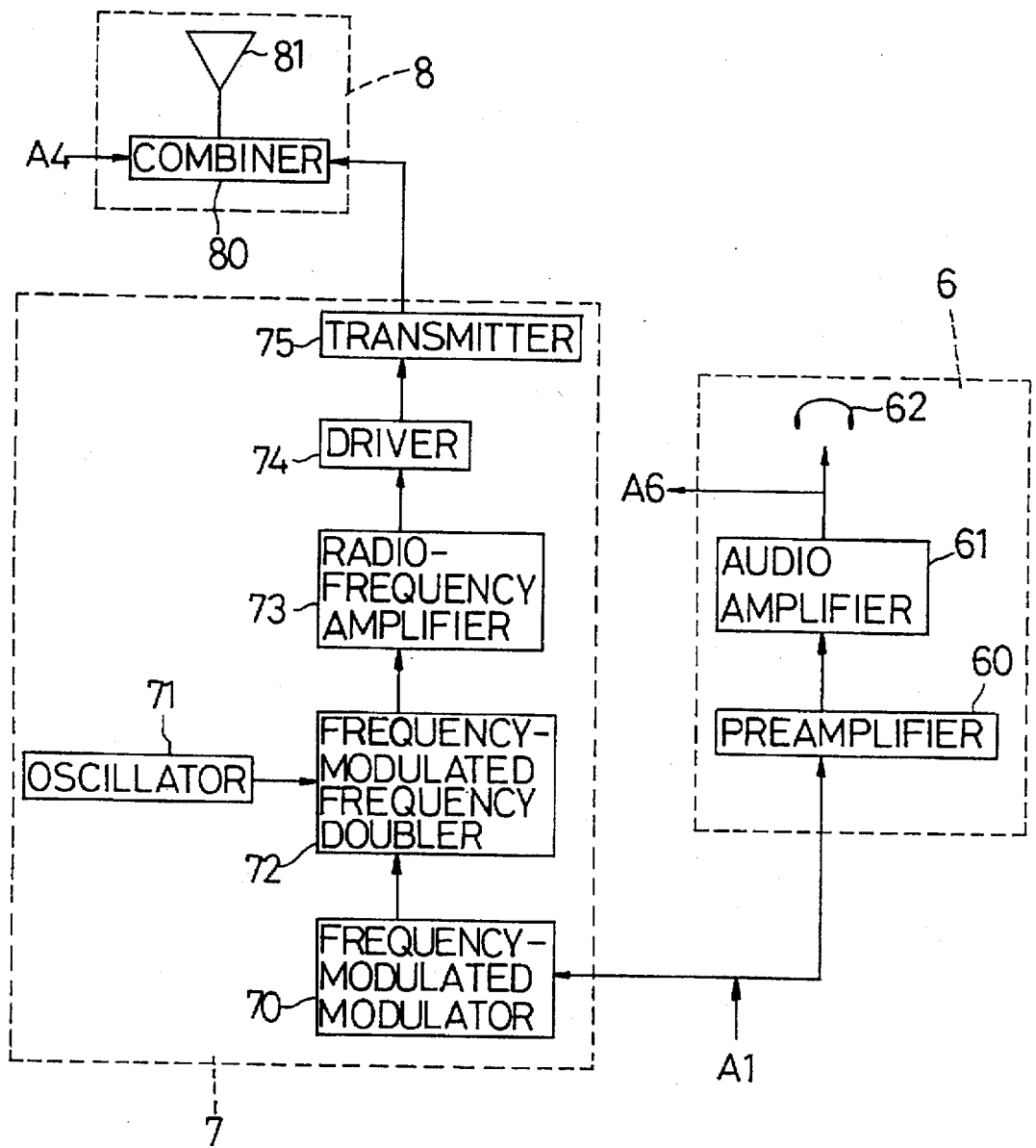

Referring to FIGS. 1A, 1B and 1C, the preferred embodiment of a karaoke device according to the present invention includes a processing unit 1, a song memory unit 2, an audio synthesizer unit 3, a digital-to-analog converting unit 4, an audio-visual signal transmitting unit 5, an earphone unit 6, a frequency-modulated transmitting unit 7, a combining circuit 8 and an optional connector unit 9. The karaoke device of the present invention is capable of wirelessly transmitting video and audio signals to a television set, for example, a colour television set.

The song memory unit 2 includes a data memory device 20, preferably a read only memory (ROM), and a buffer memory device 21, preferably a random access memory (RAM). In the present embodiment, the data memory device 20 has compressed digital audio data and lyrics data stored therein. The compressed digital audio data are preferably MIDI files that conform with the General MIDI (GM) system. The lyrics data consist of character codes. Any known digital compression technique may be employed to result in the ability to store a large number of songs and in efficient use of the data memory device 20.

Figure 2:
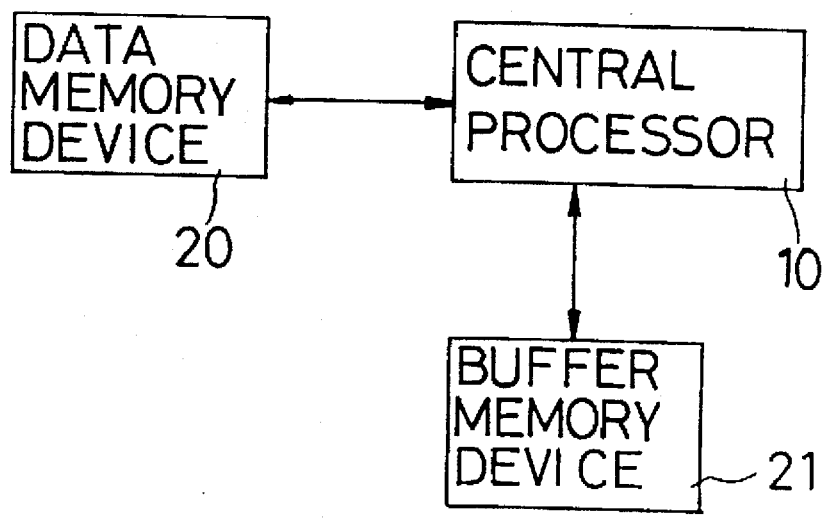
FIG. 2 is a schematic block diagram illustrating the relationship between a processor of a processing unit and a song memory unit of the preferred embodiment.

As best shown in FIGS. 1A and 2, the processing unit 1 includes a central processor 10 connected electrically to the buffer memory device 21, a function selector 11 connected electrically to the central processor 10, and a liquid crystal display 12 connected electrically to the central processor 10. In the present embodiment, the central processor 10 is the 68EC000 central processor. The central processor 10 reads corresponding compressed digital audio data and lyrics data from the data memory device 20 upon operation of the function selector 11 to input a selected song number. At the same time, the liquid crystal display 12 is activated to display the selected song number thereon. The liquid crystal display 12 can be further activated to display additional information, such as the volume and pitch settings, thereon in a known manner. The digital audio data and the lyrics data are then decompressed and are temporarily stored in the buffer memory device 21 by the central processor 10 before the central processor 10 provides the digital audio data and the lyrics data to the audio synthesizer unit 3.

Figure 3:
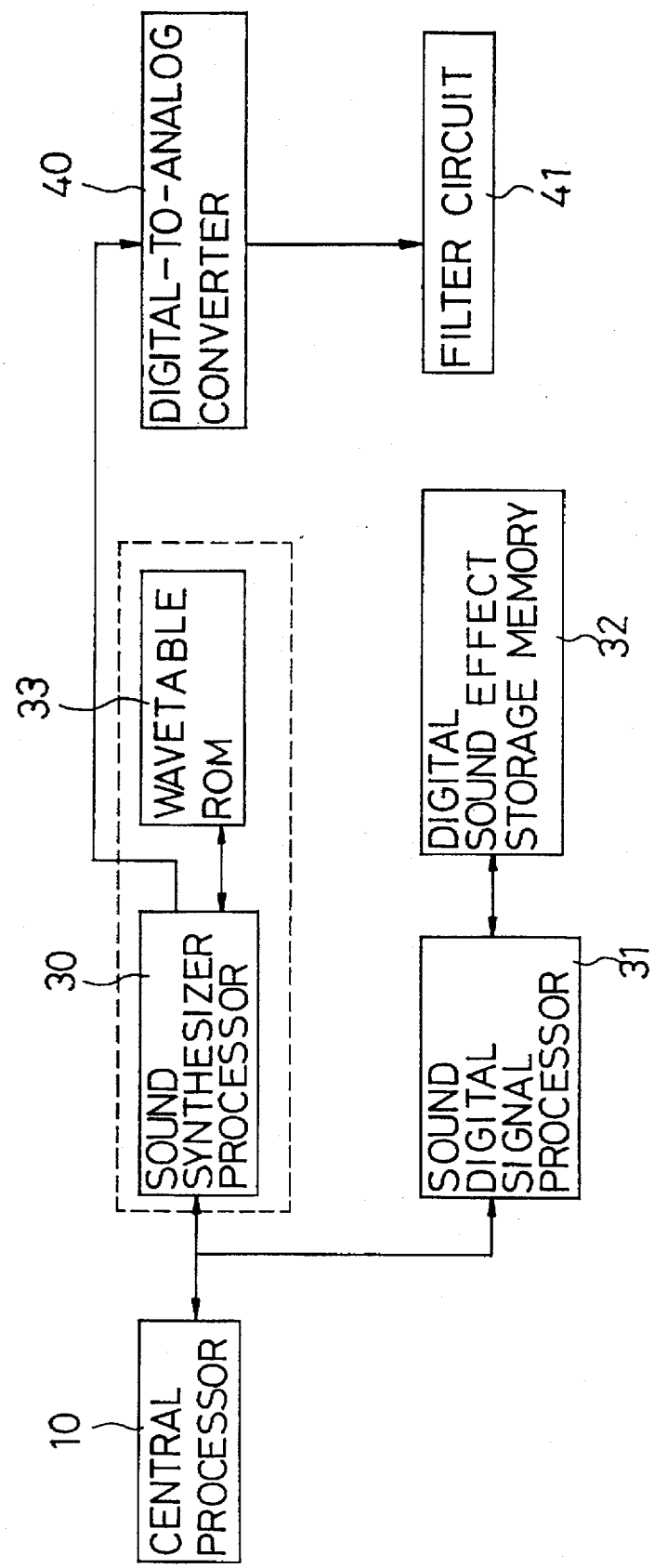
FIG. 3 is a schematic block diagram illustrating the relationship among the processor of the processing unit, an audio synthesizer unit, and a portion of a digital-to-analog converting unit of the preferred embodiment.

Referring now to FIGS. 1A and 3, the audio synthesizer unit 3 receives the decompressed digital audio data from the central processor 10 and includes a sound synthesizer processor (SSP) 30, a sound digital signal processor (SDSP) 31 and a digital sound effect storage RAM (DSER) 32. The SSP 30 is connected to the central processor 10 and a wavetable ROM 33. In the present embodiment, the SSP 30 and the wavetable ROM 33 are built into a single integrated circuit (IC) chip. The wavetable ROM 33 complies with the General MIDI (GM) system and contains 128 musical instrument sounds. The SSP 30 receives the decompressed digital audio data from the central processor 10 and processes the same so as to obtain digital sound data corresponding to the digital audio data. The SDSP 31, which is connected to both the SSP 30 and the DSER 32, receives the digital sound data from the SSP 30 and processes the same to result in a realistic, high fidelity, stereophonic digital audio output.

In the present embodiment, the SSP 30 is the ES5506 ENSONIQ "OTTO" Soundscape Wavetable Synthesizer which has the wavetable ROM 33 built therein. The SDSP 31 is the ES5510 ENSONIQ "ESP" Signal Processor. The SSP 30 has thirty-two independent channels and is capable of simultaneously generating thirty-two different instrument sounds. Upon reception of the decompressed digital audio data from the central processor 10, the SSP 30 converts the same into address data for accessing the wavetable ROM 33 to obtain the corresponding digital sound data. The SSP 30 then provides the digital sound data to the SDSP 31 in a serial manner. The SDSP 31 is programmed to operate in combination with the DSER 32 to perform delay, frequency analysis, digital filtering, and transform and other calculations so as to generate different sound effects, such as reverberation, tremolo, echo, surround, etc., thereby resulting in a realistic, high fidelity, stereophonic audio output corresponding to the desired acoustic environment.

Referring again to FIGS. 1A, 1B and 1C, the digital-to-analog converting unit 4 includes a digital-to-analog converter 40, a filter circuit 41, a first preamplifier 42, a microphone amplifier 44, a digital echo circuit 45, a second preamplifier 46, a mixer 47, an electronic volume control circuit 48 and an audio amplifier 49.

The digital-to-analog converter 40 is connected electrically to the SSP 30 so as to receive and convert the digital audio output into an analog audio signal. The first preamplifier 42 receives the analog audio signal via the filter circuit 41. The microphone amplifier 44 is adapted to be connected electrically to an external microphone unit 43 so as to receive an external voice signal therefrom. The external voice signal is then received by the mixer 47 through the digital echo circuit 45 and the second preamplifier 46. The mixer 47 mixes the analog audio signal and the external voice signal and generates a mixed audio signal output. The mixed audio signal output from the mixer 47 is then output through the audio amplifier 49 via the electronic volume control circuit 48.

The audio-visual signal transmitting unit 5 includes an image memory unit which consists of a read only memory device 53 for storing predetermined digital video data and character data therein and a random access memory device 52. In the present embodiment, the read only memory device 53 has at least thirty-two still image data, thirteen thousand seven hundred and seventy-seven Chinese characters, twenty-six English characters, fifty Japanese characters, twenty-four Korea characters, . . . etc., stored therein.

Figure 4:
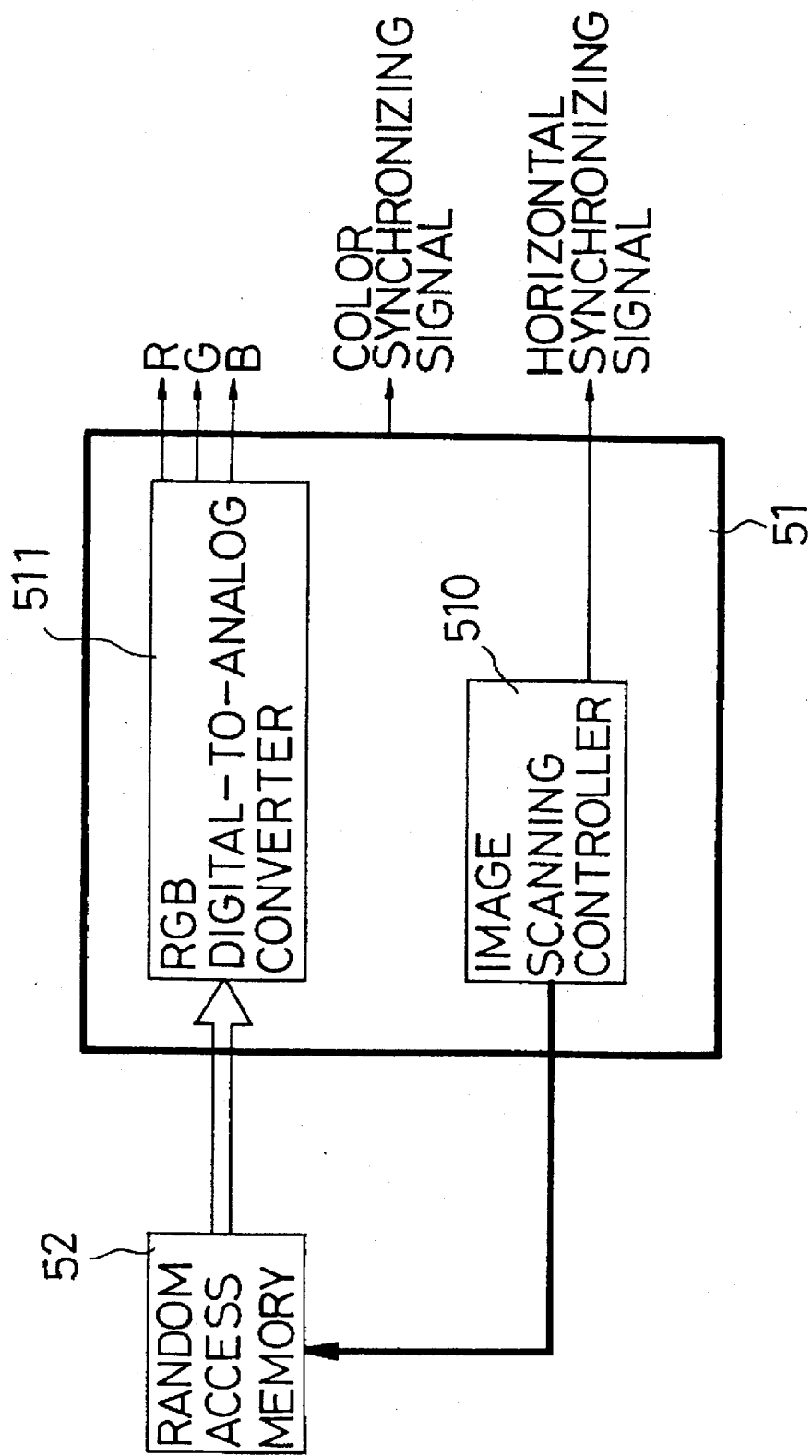
FIG. 4 is a schematic block diagram of a portion of an audio-visual signal transmitting unit of the preferred embodiment.
Figure 5:
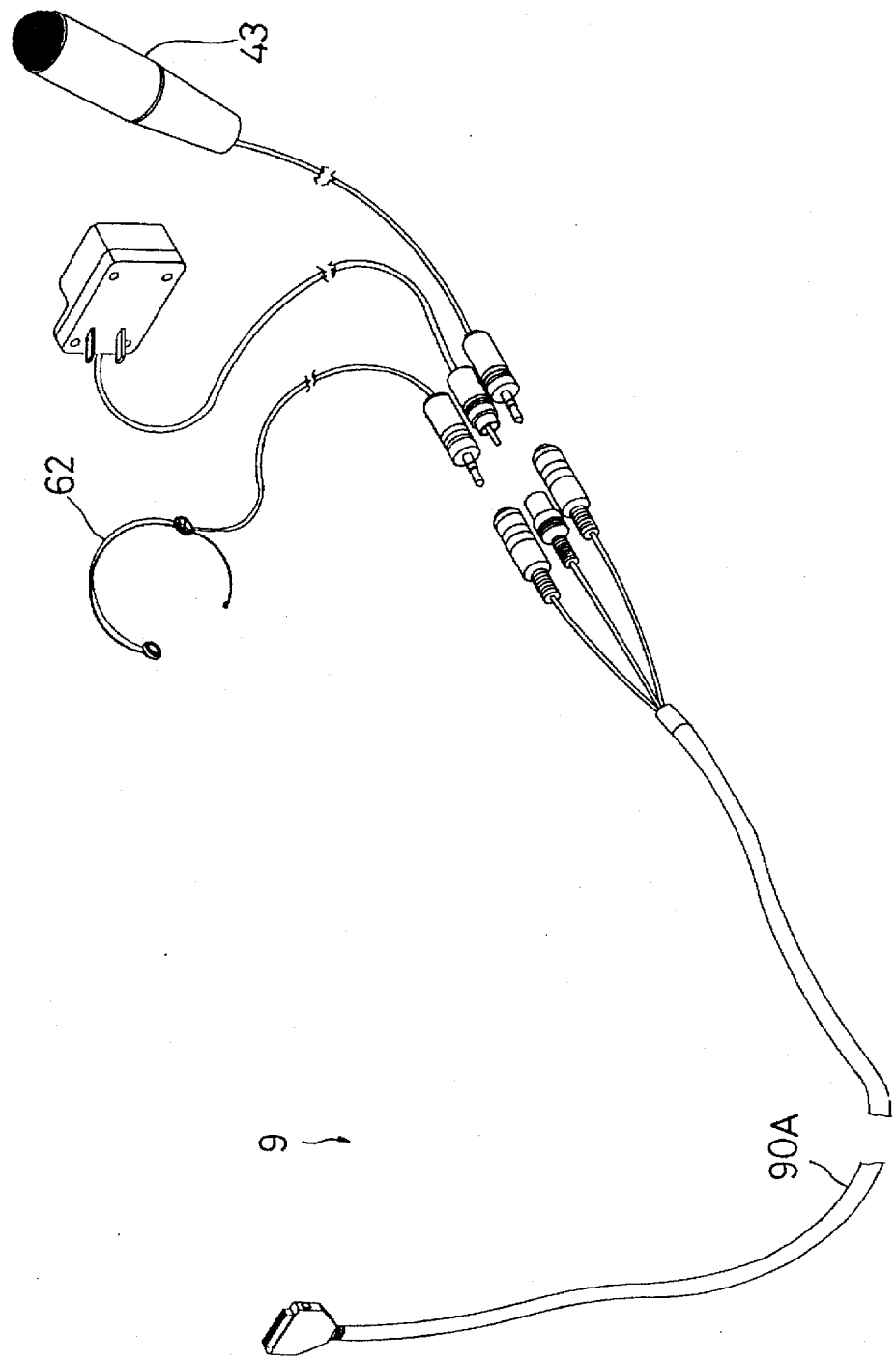
FIG. 5 is a schematic perspective view illustrating how the preferred embodiment is connected to external accessories via electrical cables.
Figure 6:
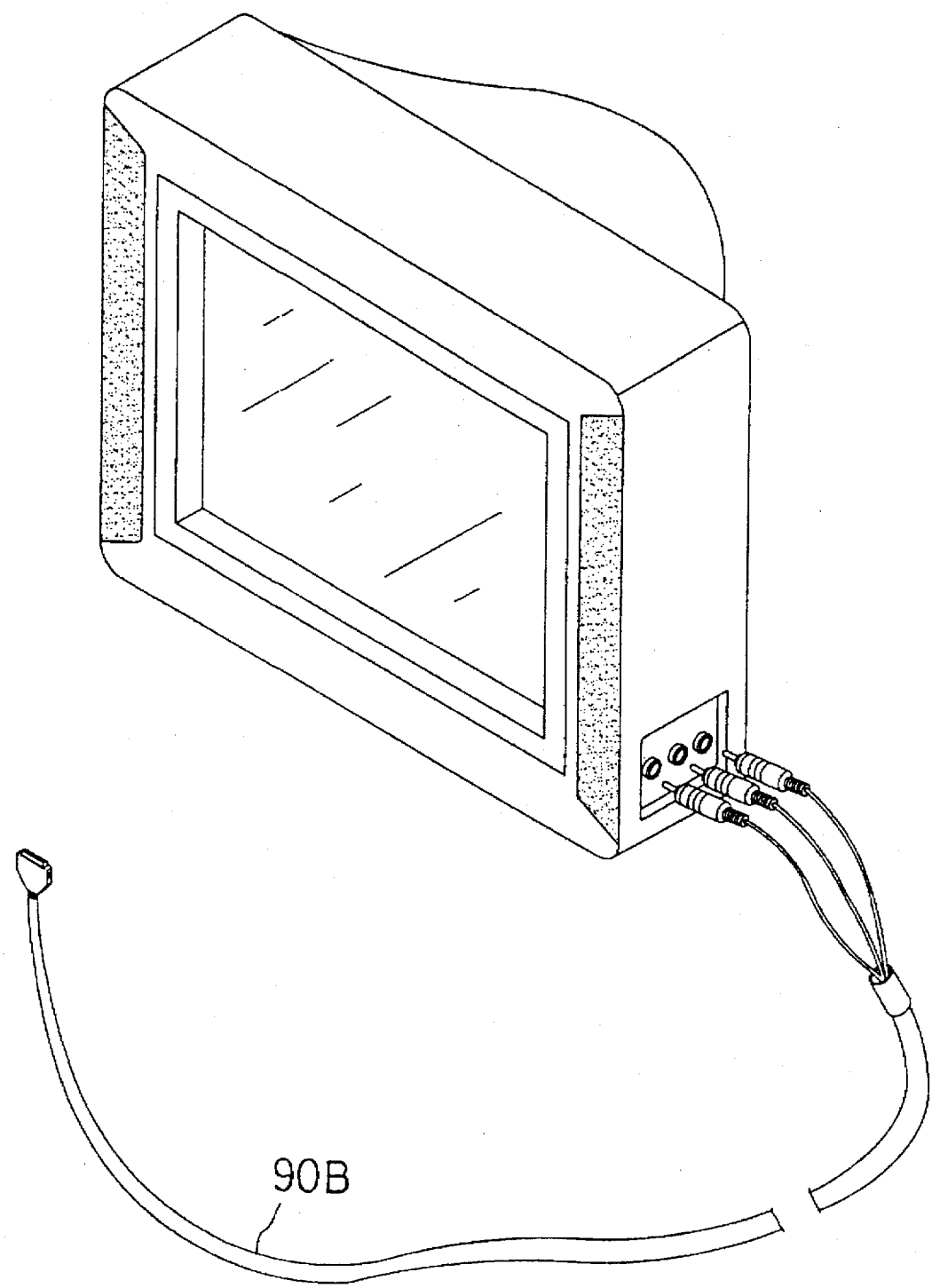
FIG. 6 is a schematic perspective view illustrating how the preferred embodiment can be optionally connected to a television set via electrical cables.

A control means includes a microprocessor 50 which is connected electrically to the central processor 10 of the processing unit 1 and the read only memory device 53 and which receives the lyrics data from the central processor 10 and the digital video data from the read only memory device 53. The microprocessor 50 temporarily retrieves and stores the digital video data from the read only memory device 53 into the random access memory device 52. The microprocessor 50 further generates character images based on the character data and corresponding to the lyrics data in accordance with the program stored in a read only memory device 54. The control means further includes a control circuit 51 that is connected electrically to the microprocessor 50 and the random access memory 52 and that is operable to convert the digital video data to an analog video signal on which the character image are superimposed. In the present embodiment, the control circuit 51 is an application specific integrated circuit (ASIC) and consists of a RGB digital-to-analog converter 511 and an image scanning controller 510, as shown in FIG. 4.

The image scanning controller 510 continuously scans the digital video signal stored in the random access memory device 52. The digital-to-analog converter 511 converts the digital video data to the analog video signal in RGB color space and generates color synchronizing signals. It should be noted that, in the present embodiment, one pixel of an image is represented by 24 bits memory such that the digital-to-analog converter 511 generates 256-levels of RGB analog signal. Therefore, 16777216 color variations (full color) can be generated. The data memory device 20 contains a rhythm control code which informs the microprocessor 50 to vary the color attribution of the lyrics data. Therefore, the color of the character images being displayed can be varied in accordance with the rhythm.

A modulator 55 is connected electrically to the control circuit 51 and the audio amplifier 49 so as to receive the video signal from the control circuit 51 and the audio signal output from the audio amplifier 49 of the converting unit 4 and so as to generate a modulated video signal and a modulated audio output. A frequency doubler 56 is connected electrically to an oscillator 57 and to the modulator 55 so as to receive the modulated video signal and the modulated audio output. The frequency doubler 56 increases the frequency of the modulated video signal and the modulated audio output to a range which can be accepted by the television set.

A radio-frequency amplifier 581 of a transmitting circuit 58 is connected electrically to the frequency doubler 56. The transmitting circuit 58 further includes a transmitter 583 connected electrically to the radio-frequency amplifier 581 via a driver 582.

The earphone unit 6 includes a preamplifier 60 connected electrically to the audio amplifier 49, an audio amplifier 61 connected electrically to the preamplifier 60, and an earphone 62 connected electrically to the audio amplifier 61.

The frequency-modulated transmitting unit 7 includes a frequency-modulated modulator 70 connected electrically to the audio amplifier 49 so as to receive and modulate the mixed audio signal output, a frequency-modulated frequency doubler 72 connected electrically to an oscillator 71 and the frequency-modulated modulator 70 so as to increase frequency of the mixed audio signal output to a range acceptable by an FM radio receiver (not shown), a radio-frequency amplifier 73 connected electrically to the frequency-modulated frequency doubler 72 so as to amplify the modulated mixed audio signal output, and a transmitting circuit which includes a transmitter 75 connected to the radio-frequency amplifier 73 via a driver 74.

The combining circuit 8 includes a π-type combiner 80 connected electrically to an antenna 81 and to the transmitting circuits of the audio-visual signal transmitting unit 5 and the frequency-modulated transmitting unit 7 such that transmission of the video signal and the audio output from the frequency doubler to the television set, transmission of the audio output to the earphone unit 6, and transmission of the audio output to the radio receiver can be simultaneously achieved with the use of only one antenna 81.

Referring now to FIGS. 1A, 1B and 1C, 5 and 6, the connector unit 9 includes an output socket 90 which is connected electrically to the modulator 55 via an amplifier 551. The output socket 90 is further connected to the audio amplifier 49, to the audio amplifier 61 and to the microphone amplifier 44. The connector unit 9 further includes a first cable 90A which has one end connected electrically to the output socket 90 and another end connected electrically to the earphone 62, the microphone 43 and an AC plug, and a second cable 90B which has one end connected electrically to the output socket 90 and another end connected electrically to the television set such that the karaoke device of the present invention can still be used in some areas where radio transmission is prohibited or where radio interference easily occurs.

In use, upon the operation of the function selector 11 to input a selected song number, the central processor 10 reads corresponding compressed digital audio data and lyrics data from the data memory device 20. At the same time, the liquid crystal display 12 is activated to display the selected song number thereon. The digital audio data and the lyrics data are then decompressed and are temporarily stored in the buffer memory device 21 by the central processor 10 before the central processor 10 provides the digital audio data and the lyrics data to the audio synthesizer unit 3.

The audio synthesizer unit 3 receives and processes the decompressed digital audio data from the central processor 10 so as to generate a realistic, high fidelity, stereophonic digital audio output.

Afterwards, the digital-to-analog converting unit 4 receives and processes the digital audio output from the sound synthesizer processor 30 of the audio synthesizer unit 3 so as to generate a mixed audio signal output.

The mixed audio signal output from the audio amplifier 49 of the converting unit 4 is received by the audio-visual signal transmitting unit 5, the frequency-modulated transmitting unit 7 and the earphone unit 6, and is processed by the audio-visual signal transmitting unit 5 with the corresponding video signal and by the frequency-modulated transmitting unit 7. After the mixed audio signal output is processed, transmission of the video signal and the audio output from the audio-visual signal transmitting unit 5 to the television set, transmission of the audio output to the earphone unit 6, and transmission of the audio output from the frequency-modulated transmitting unit 7 to the radio receiver can be simultaneously achieved.

It should be noted that, the strength of the echo effect can be selectively controlled by the operation of the function selector 11. When the function selector 11 is operated to adjust the strength of the echo effect, the external voice signal from the external microphone unit 43 is processed by the digital echo circuit 45. Furthermore, the output volume of the mixed audio signal output can also be selectively controlled by the operation of the function selector 11 with the use of the electronic volume control circuit 48 in the same manner. The function selector 11 can be further operated to program songs to be played in a known manner.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A karaoke device capable of wirelessly transmitting video and audio signals to a television set, said karaoke device comprising:

a song memory unit for storing digital audio data and lyrics data therein;

a processing unit connected electrically to said song memory unit and operable to retrieve said digital audio data and said lyrics data from said song memory unit;

an audio synthesizer unit, connected electrically to said processing unit, for receiving said digital audio data and for generating a stereophonic digital audio output corresponding to said digital audio data;

a digital-to-analog converting unit including a digital-to-analog converter which is connected electrically to said synthesizer unit and which receives and converts said digital audio output into an analog audio signal, and a mixer which is connected electrically to said converter so as to receive said analog audio signal and which is adapted to be connected electrically to an external microphone unit so as to receive an external voice signal therefrom, said mixer mixing said analog audio signal and the external voice signal and generating a mixed audio signal output; and an audio-visual signal transmitting unit including
an image memory unit for storing predetermined digital video data and character data therein,
control means, connected electrically to said processing unit and said image memory unit, for receiving said lyrics data from said processing unit and said digital video data from said image memory unit, said control means being operable to convert said digital video data to an analog video signal and to generate character images based on said character data and corresponding to said lyrics data, said character images being superimposed on said analog video signal,
a modulator connected electrically to said control means and said converting unit so as to received said video signal from said control means and said audio signal output from said converting unit and so as to generate a modulated video signal and a modulated audio output,
a frequency doubler connected electrically to said modulator so as to receive said modulated video signal and said modulated audio output, said frequency doubler increasing frequency of said modulated video signal and said modulated audio output to a range which can be accepted by the television set, and
a transmitting circuit, connected electrically to said frequency doubler, for transmitting wirelessly said video signal and said audio output from said frequency doubler for reception by the television set, wherein said audio synthesizer unit includes a sound synthesizer processor connected electrically to said processing unit, a sound digital signal processor connected electrically to said sound synthesizer processor, and a digital sound effect storage memory connected electrically to said sound digital signal processor, said sound synthesizer processor receiving said digital audio data from said processing unit and processing said digital audio data to obtain digital sound data, said sound digital signal processor processing said digital sound data to generate said digital audio output which is received by said converting unit.

2. A karaoke device as claimed in claim 1, wherein said song memory unit includes a data memory device connected to said processing unit for storing said digital audio data and said lyrics data therein.

3. A karaoke device as claimed in claim 2, wherein said digital audio data and said lyrics data in said data memory device are compressed digital audio data and lyrics data, said memory unit further including a buffer memory device connected to said processing unit, said processing unit decompressing said compressed digital audio data and said compressed lyrics data, and storing decompressed digital audio data and decompressed lyrics data in said buffer memory device before providing said decompressed digital audio data and said decompressed lyrics data to said sound synthesizer unit.

4. A karaoke device as claimed in claim 1, further comprising an earphone unit which includes a preamplifier connected electrically to said converting unit, an audio amplifier connected electrically to said preamplifier, and an earphone connected electrically to said audio amplifier.

5. A karaoke device as claimed in claim 1, further comprising a frequency-modulated transmitting unit which includes a frequency-modulated modulator connected electrically to said converting unit so as to receive and modulate said mixed audio signal output, a frequency-modulated frequency doubler connected electrically to said frequency-modulated modulator so as to increase frequency of said mixed audio signal output to a range acceptable by a radio receiver, a radio-frequency amplifier connected electrically to said frequency-modulated frequency doubler so as to amplify said modulated mixed audio signal output, and a transmitting circuit, connected electrically to said radio-frequency amplifier, for transmitting wirelessly said modulated mixed audio signal output from said radio-frequency amplifier for reception by the radio receiver.

6. A karaoke device as claimed in claim 4, further comprising a frequency-modulated transmitting unit which includes a frequency-modulated modulator connected electrically to said converting unit so as to receive and modulate said mixed audio signal output, a frequency-modulated frequency doubler connected electrically to said frequency-modulated modulator so as to increase frequency of said mixed audio signal output to a range acceptable by a radio receiver, a radio-frequency amplifier connected electrically to said frequency-modulated frequency doubler so as to amplify said mixed audio signal output, and a transmitting circuit, connected electrically to said radio-frequency amplifier, for transmitting wirelessly said modulated mixed audio signal output from said radio-frequency amplifier for reception by the radio receiver.

7. A karaoke device as claimed in claim 6, further comprising a combining circuit which is connected electrically to said transmitting circuits of said audio-visual signal transmitting unit and said frequency-modulated transmitting unit such that transmission of said video signal and said audio output from said frequency doubler to the television set, transmission of said audio output to said earphone unit, and transmission of said audio output to the radio receiver can be simultaneously achieved.

* * * * *